US008928310B2

United States Patent
Ocket et al.

(10) Patent No.: US 8,928,310 B2
(45) Date of Patent: Jan. 6, 2015

(54) MAGNETOELECTRONIC ANGLE SENSOR, IN PARTICULAR A RELUCTANCE RESOLVER

(75) Inventors: Tom Ocket, Torhout (BE); Jan Van Cauwenberge, Aalter (BE); Jurgen Verstraete, Roeselare (BE)

(73) Assignee: Tyco Electronics Belgium EC BVBA, Oostkamp (BE)

( * ) Notice: Subject to any disclaimer, the term of this patent is extended or adjusted under 35 U.S.C. 154(b) by 649 days.

(21) Appl. No.: 13/320,488

(22) PCT Filed: Apr. 23, 2010

(86) PCT No.: PCT/EP2010/055484
§ 371 (c)(1),
(2), (4) Date: Nov. 14, 2011

(87) PCT Pub. No.: WO2010/130550
PCT Pub. Date: Nov. 18, 2010

(65) Prior Publication Data
US 2012/0068693 A1   Mar. 22, 2012

(30) Foreign Application Priority Data

May 15, 2009   (DE) .......................... 10 2009 021 444

(51) Int. Cl.
| | |
|---|---|
| G01B 7/14 | (2006.01) |
| G01B 7/30 | (2006.01) |
| H01F 5/00 | (2006.01) |
| G01D 5/20 | (2006.01) |

(52) U.S. Cl.
CPC ................ *G01D 5/2046* (2013.01); *H01F 5/00* (2013.01); *G01B 7/30* (2013.01); *G01B 7/14* (2013.01)
USPC ............ 324/207.17; 324/207.18; 324/207.25; 324/207.16; 324/207.23; 324/207.21; 324/207.13; 324/207.12; 235/449; 235/95 R; 235/95 C; 235/96; 310/68 B; 318/661

(58) Field of Classification Search
CPC ............... G01B 7/14; G01B 7/30; H01F 5/00
USPC ............ 324/207.18, 207.25, 207.16, 207.17, 324/207.23, 207.21, 207.13, 207.12; 310/68 B; 318/661; 235/449, 95 R, 95 C, 235/96
See application file for complete search history.

(56) References Cited

U.S. PATENT DOCUMENTS

| | | | | | |
|---|---|---|---|---|---|
| 3,641,467 | A | * | 2/1972 | Ringland et al. | ................... 336/5 |
| 5,150,115 | A | * | 9/1992 | deJong et al. | ............ 340/870.31 |

(Continued)

FOREIGN PATENT DOCUMENTS

| | | |
|---|---|---|
| DE | 1 054 354 A | 4/1959 |
| EP | 1507130 A2 | 2/2005 |

OTHER PUBLICATIONS

Chengjun et al., "The Analysis for New Axial Variable Reluctance Resolver with Air-gap Complementary Structure", ICEMS 2009, Nov. 15-18, 2009, pp. 1-6.*

(Continued)

*Primary Examiner* — Patrick Assouad
*Assistant Examiner* — Lamarr Brown
(74) *Attorney, Agent, or Firm* — Faegre Baker Daniels LLP

(57) ABSTRACT

The present invention relates to a reluctance resolver (100) with an at least partially soft magnetic stator (104) and an at least partially soft magnetic rotor (102) which oppose each other by forming an air gap. The magnetic resistance in the air gap changes periodically on account of a configuration of the rotor that varies over the circumference. The angle sensor has a magnetic flux transmitter which is arranged on the stator and generates a predefined magnetic flux distribution in the air gap via at least one pair of poles. Furthermore, a magnetic flux receiver, which measures the intensity of the magnetic field via at least two pairs of signal poles arranged offset from one another at an angle, is arranged on the stator, wherein an angle value for a position of the rotor in relation to the stator can be derived from the two receiver signals. According to the invention, the stator (104) has distributed over the circumference a large number of teeth (110) which are separated from one another by grooves, and the magnetic flux transmitter comprises at least two primary windings which are arranged in such a way that at least one of the teeth carries no primary windings.

15 Claims, 14 Drawing Sheets

(56) References Cited

U.S. PATENT DOCUMENTS

| | | | |
|---|---|---|---|
| 5,300,884 A * | 4/1994 | Maestre | 324/207.25 |
| 5,521,494 A * | 5/1996 | Hore et al. | 324/207.16 |
| 5,757,182 A * | 5/1998 | Kitazawa | 324/207.17 |
| 6,081,058 A * | 6/2000 | Suzuki et al. | 310/156.45 |
| 6,255,810 B1 * | 7/2001 | Irle et al. | 324/207.17 |
| 7,030,532 B2 * | 4/2006 | Kobayashi et al. | 310/168 |
| 7,135,860 B2 * | 11/2006 | Miya et al. | 324/207.25 |
| 7,138,796 B2 * | 11/2006 | Miya | 324/207.25 |
| 8,080,960 B2 * | 12/2011 | Rozman et al. | 318/400.33 |
| 8,129,985 B2 * | 3/2012 | Lee et al. | 324/207.25 |
| 2002/0005674 A1 * | 1/2002 | Hayashi | 310/168 |
| 2004/0066184 A1 * | 4/2004 | Kobayashi et al. | 324/207.12 |
| 2004/0150275 A1 * | 8/2004 | Koyama et al. | 310/71 |
| 2004/0174162 A1 * | 9/2004 | Kuwahara | 324/207.25 |
| 2005/0122097 A1 * | 6/2005 | Kitazawa | 324/207.17 |
| 2005/0212511 A1 * | 9/2005 | Kujirai et al. | 324/207.25 |
| 2006/0043965 A1 * | 3/2006 | Murakami et al. | 324/207.25 |
| 2006/0232270 A1 | 10/2006 | Ijima | |
| 2006/0279277 A1 * | 12/2006 | Kishi et al. | 324/207.16 |
| 2007/0205761 A1 * | 9/2007 | Chang et al. | 324/207.25 |
| 2008/0054887 A1 * | 3/2008 | Lee | 324/207.17 |
| 2008/0197836 A1 * | 8/2008 | Lee et al. | 324/207.16 |
| 2009/0033320 A1 * | 2/2009 | Kikuchi et al. | 324/207.25 |
| 2009/0179529 A1 * | 7/2009 | Makino et al. | 310/68 B |
| 2009/0179632 A1 * | 7/2009 | Nishiguchi et al. | 324/207.25 |
| 2009/0289622 A1 * | 11/2009 | Kikuchi et al. | 324/207.25 |
| 2010/0045222 A1 * | 2/2010 | Rozman et al. | 318/400.33 |
| 2010/0085039 A1 * | 4/2010 | Goto | 324/207.18 |
| 2010/0097055 A1 * | 4/2010 | Kimura | 324/207.25 |
| 2010/0181995 A1 * | 7/2010 | Inoue | 324/207.16 |
| 2010/0212143 A1 * | 8/2010 | Kataoka et al. | 29/602.1 |
| 2010/0219816 A1 * | 9/2010 | Urano et al. | 324/207.25 |
| 2010/0244816 A1 * | 9/2010 | Nakamura | 324/207.25 |
| 2010/0321007 A1 * | 12/2010 | Fukuda et al. | 324/207.25 |
| 2011/0043196 A1 * | 2/2011 | Fujita et al. | 324/207.16 |
| 2011/0057648 A1 * | 3/2011 | Goto et al. | 324/207.25 |
| 2011/0109304 A1 * | 5/2011 | Suzuki et al. | 324/207.25 |
| 2011/0133965 A1 * | 6/2011 | Kikuchi et al. | 341/116 |
| 2011/0169382 A1 * | 7/2011 | Coleman et al. | 310/68 B |
| 2011/0187356 A1 * | 8/2011 | Li et al. | 324/207.25 |
| 2011/0279112 A1 * | 11/2011 | Aihara et al. | 324/207.25 |
| 2011/0285386 A1 * | 11/2011 | Kikuchi et al. | 324/207.17 |
| 2012/0007592 A1 * | 1/2012 | Manabe et al. | 324/207.25 |
| 2012/0032669 A1 * | 2/2012 | El Baraka et al. | 324/207.25 |
| 2012/0126833 A1 * | 5/2012 | Dooley | 324/657 |
| 2012/0139533 A1 * | 6/2012 | Manabe | 324/207.25 |
| 2012/0194177 A1 * | 8/2012 | Park | 324/207.18 |
| 2012/0209562 A1 * | 8/2012 | Ehrmann et al. | 702/151 |
| 2012/0229124 A1 * | 9/2012 | Lai et al. | 324/207.25 |
| 2012/0229125 A1 * | 9/2012 | Teng et al. | 324/207.25 |
| 2012/0249127 A1 * | 10/2012 | Sakamoto et al. | 324/207.21 |
| 2012/0262158 A1 * | 10/2012 | Matsuura et al. | 324/207.17 |
| 2012/0262161 A1 * | 10/2012 | Kinashi | 324/207.25 |
| 2012/0274316 A1 * | 11/2012 | Matsuura et al. | 324/207.17 |
| 2012/0280678 A1 * | 11/2012 | Yura et al. | 324/207.16 |
| 2012/0306513 A1 * | 12/2012 | Stradinger | 324/693 |
| 2012/0313628 A1 * | 12/2012 | Van Nimmen et al. | 324/207.15 |
| 2013/0021022 A1 * | 1/2013 | Takei et al. | 324/207.15 |
| 2013/0043864 A1 * | 2/2013 | Ogawa et al. | 324/207.15 |
| 2013/0049742 A1 * | 2/2013 | Ochiai | 324/207.16 |
| 2013/0069475 A1 * | 3/2013 | Ocket et al. | 310/208 |
| 2013/0127449 A1 * | 5/2013 | Backes | 324/207.18 |
| 2013/0127451 A1 * | 5/2013 | Eom et al. | 324/207.25 |
| 2013/0169270 A1 * | 7/2013 | Delbaere et al. | 324/207.25 |
| 2013/0234637 A1 * | 9/2013 | Shinmoto et al. | 318/400.26 |
| 2013/0271121 A1 * | 10/2013 | Noritake | 324/207.18 |

OTHER PUBLICATIONS

Sun et al., "Rotor-postion Sensing System based on one type of Variable-reluctance Resolver", IECON 2006, Nov. 6-10, 2006, pp. 1162-1165.*

Search Report issued by the German Patent and Trademark Office, Munich, Germany, dated Oct. 29, 2009, for German patent Application No. 10 2009 021 444.5-32; 4 pages.

International Preliminary Report on Patentability, issued by The International Bureau of WIPO, Geneva, Switzerland, dated Nov. 15, 2011, for International PCT Application No. PCT/EP2010/055484; 4 pages.

Qiang Fu, et al., "Novel Electromagnetic Rotor Position Sensor for Brushless DC Machine in Aviation and Aerospace Industry." 1-4244-2386-6/08; © 2008 IEEE; 6 pages.

International Search Report and Written Opinion issued by the European Patent Office, Rijswijk, Netherlands, dated Oct. 4, 2010, for International Application No. PCT/EP2010/055484; 7 pages.

* cited by examiner

MAGNETOELECTRONIC ANGLE SENSOR, IN PARTICULAR A RELUCTANCE RESOLVER

The present invention relates to a magnetoelectronic angle sensor, in particular a reluctance resolver with a rotationally symmetrical, at least partially soft magnetic stator and a rotationally symmetrical, at least partially soft magnetic rotor which oppose each other by forming an air gap. The magnetic resistance in the air gap changes periodically on account of a configuration of the rotor that varies over the circumference. The angle sensor has a magnetic flux transmitter which is arranged on the stator and generates a predefined magnetic flux distribution in the air gap via at least one pair of poles. Furthermore, a magnetic flux receiver, which measures the intensity of the magnetic field via at least two pairs of signal poles arranged offset from one another at an angle, is arranged on the stator, wherein an angle value for a position of the rotor in relation to the stator can be derived from the two receiver signals.

Angle sensors of this type, which are based on the principle of a variable magnetic flux intensity in the air gap between the stator and rotor, are known in a broad range of forms. Basically, these draw on different principles for generating the magnetomotive force in the transmitting part and also different principles for measuring the magnetic field in the receiver part. In rotary indicators (resolvers, synchros), electromagnetic coils are used in the form of primary and secondary windings. Rotary indicators of this type in the form of resolvers or synchros have long been known as accurate and robust angle sensors. Also known in this regard are what are referred to as passive reluctance resolvers in which both the primary winding and the secondary winding are accommodated in the stator, whereas the rotor influences the magnetic flux circuit in a windingless manner, i.e. passively, merely with soft magnetic parts. As a result of a non-uniform configuration of the soft magnetic rotor, for example by providing lobes, the magnetic flux between the primary windings and the secondary windings in the stator is influenced differently; the angular position of the rotor may be derived from this via the induced voltage.

FIG. 1 shows an example of a known winding diagram, such as may be seen from EP 0 522 941 or EP 0 802 398, for example. In this case, two windings are attached to each of the teeth of the stator: a respective primary winding and a sine or cosine winding, the primary winding being attached in an alternating direction to respectively adjacent poles of the stator. Furthermore, it is known from EP 0802398 to provide three windings on most poles.

Reluctance resolvers of this type can be manufactured economically owing to the lack of an active rotor provided with windings and the concomitant saving of a transformer part. However, most known reluctance resolver arrangements have the drawback that the arrangement of the windings on the stator leads to comparatively complex assembly methods. Furthermore, reluctance resolvers in which the variation of the magnetic resistance is achieved by a club or kidney-shaped rotor, wherein the height of the air gap between the circumference of the rotor on the one hand and the stator teeth on the other hand changes markedly with the circumferential angle, have the problem that tolerances, in particular a radial offset, can have a particularly pronounced effect on the accuracy of measurement. The reason for this may be identified above all in the fact that the height of air gap in the radial direction is decisive for the magnetic coupling.

The aim of the present invention is to disclose an angle sensor which can be manufactured particularly simply and economically and in addition has improved accuracy.

A passive reluctance resolver according to the present invention is constructed in such a way that the soft magnetic stator has a predefined number of grooves and teeth distributed in alternation over the circumference and that a primary winding is arranged in the grooves of the stator by partial windings connected in series. Also arranged in the grooves are two secondary windings which are offset from each other at an angle and each form, by partial windings which are connected in series and alternate in opposite directions, pairs of poles, the numbers of which differ from that of the primary winding by an integral factor. The soft magnetic rotor changes its cross sectional shape with a number of periods corresponding to the speed number of the angle sensor.

In this case, what is known as the speed number or number of pairs of signal poles denotes the number of complete periods through which the electrical signal, which can be tapped off at the secondary windings, passes during a complete mechanical revolution, i.e. 360°, of the rotor. That means that in a one-speed resolver the electrical angle corresponds to the angle of mechanical revolution, while in a three-speed resolver the electrical angle of 360° is already reached on a mechanical revolution of 120°.

According to the invention, the primary windings are arranged in such a way that in each case at least one tooth which carries no primary windings is located between the teeth carrying them. On the one hand, this arrangement allows the resolver to be machine wound in a simple manner. On the other hand, in the case of an eccentricity of the rotor caused by tolerances, the errors which occur can be reduced. Finally, the winding can also be carried out on loose coil bodies with just one coil, the loose coil bodies subsequently being fitted on the stator and connected to one another via a circuit board or a lead frame, for example.

According to an advantageous embodiment of the present invention, the partial windings of the primary windings do not have an alternating winding direction, but are all wound in the same direction, for example in a manner such that the magnetic flux is directed inward in the direction toward the axis of rotation of the rotor.

Nevertheless, the inverse orientation could also be provided and in some cases a certain number of poles can also be wound in the opposite direction in order to compensate for asymmetrical magnetic fluxes.

According to the invention, the expression $$\frac{4 \cdot n \cdot p}{t}$$

is an odd number. In this case, n is the number of phases (for conventional resolvers this is usually two, namely sine and cosine), p is equal to the number of lobes which form the signal-generating shaping on the rotor, and t is the number of teeth of the stator.

According to a first advantageous embodiment, the partial windings of the primary winding (referred to hereinafter in most cases simply as the "primary windings") are arranged on the even-numbered teeth and all wound in such a way that the magnetic flux is oriented in the direction toward the axis of rotation of the resolver when the voltage at the primary winding is positive. The magnetic flux is fed back through the odd-numbered teeth. The odd-numbered teeth carry as secondary windings the cosine secondary winding and sine secondary winding. Output voltages are induced in the windings around the odd-numbered teeth.

If a symmetrical construction is selected, i.e. a construction in which the windings of mutually opposing teeth are each the same, the sensitivity to an eccentricity of the rotor with regard to the stator is reduced.

In order to increase the accuracy and the insensitivity to tolerances still further, provision may also be made, in accordance with a further advantageous embodiment, for two windings to be arranged on each tooth of the stator. Again, the primary winding is located in each case on teeth which are in each case not adjacent to one another, thus providing for the teeth that either a primary winding with a sine winding, a primary winding with a cosine winding or two secondary windings, namely a sine and a cosine winding, are accommodated with each other on one and the same tooth. Again, according to the invention, the expression $$\frac{4 \cdot n \cdot p}{t}$$

is intended to be an odd number. According to the invention, the rotor and the winding diagram are symmetrical, so that eccentricities can be compensated for even more effectively.

According to an advantageous development of the present invention, the resolver can furthermore comprise at least one return path for returning the electrical signal, the return path being arranged in a plane transverse to the axis of rotation of the rotor. This return path can easily prevent the occurrence in the direction of the axis of rotation of a magnetic flux which might influence the output signals in an undesirable manner.

In order to better understand the present invention, the invention will be described in greater detail based on the exemplary embodiments illustrated in the following figures. In this case, like parts are provided with like reference symbols and like component designations. Furthermore, individual features or combinations of features from the shown and described embodiments may also be solutions which are, on their own merits, independent inventive solutions or solutions according to the invention. In the drawings.

Figure 1:
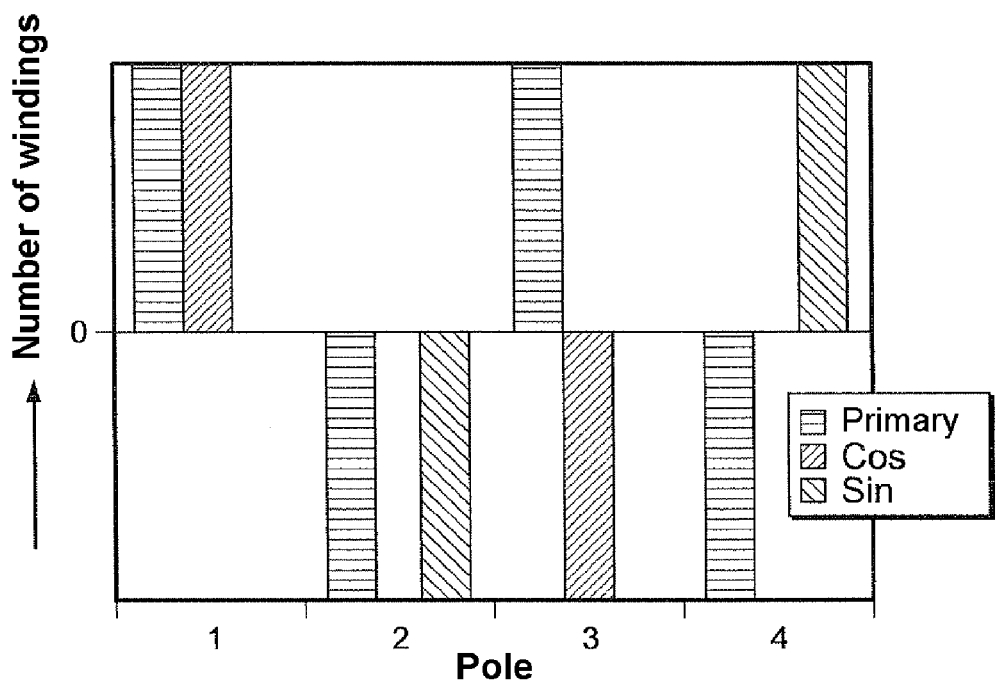
FIG. 1 shows an example of a winding diagram according to the prior art.
Figure 2:
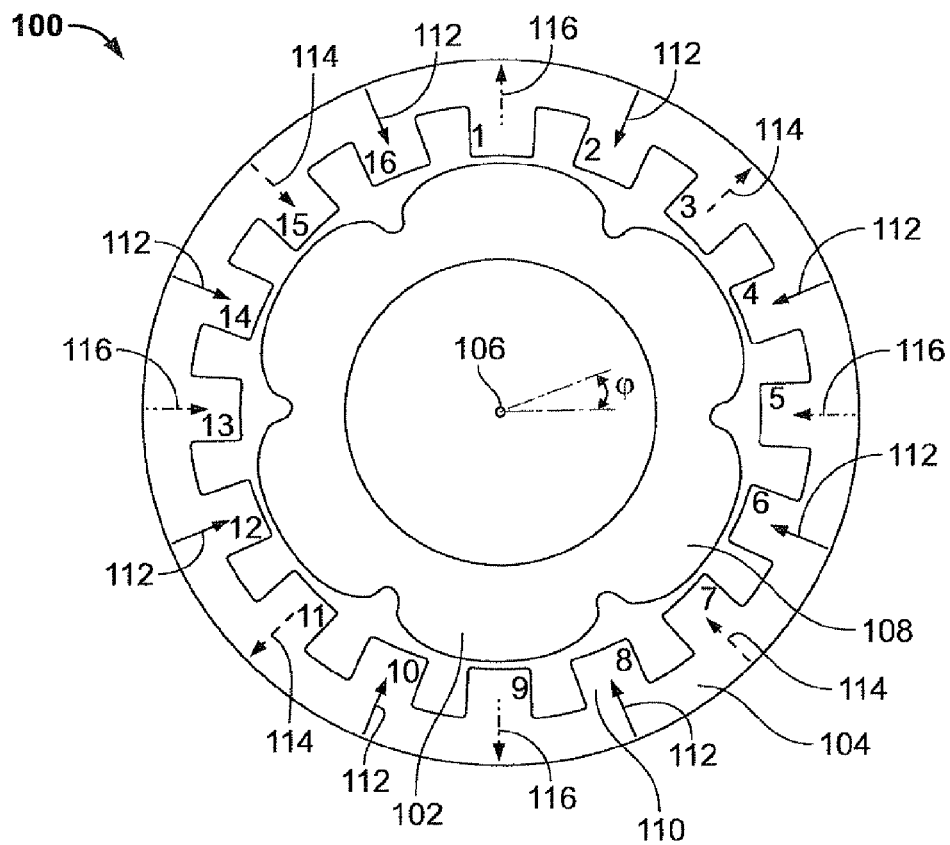
FIG. 2 is a schematic cross section through a six-speed resolver according to a first embodiment of the present invention.

FIG. 2 is a schematic cross section through a six-speed resolver 100 according to a first embodiment of the present invention. In this case, a soft magnetic rotor 102 is mounted within a stator 104 so as to be rotatable about an axis of rotation 106. The rotor in the embodiment shown in this figure has six lobes 108 which cause during rotating about the axis 106 a variable air gap between the teeth 110 of the stator 104 and the rotor 102.

The six-speed resolver arrangement shown in this figure provides a total of sixteen teeth 110 which in FIG. 2 are serially numbered in the clockwise direction. The magnetic fluxes occurring at the teeth 110 are symbolised by arrows. According to the invention, the even-numbered teeth, which may also be referred to as poles, carry in this case primary windings which are wound in such a way that their magnetic flux 112 is directed inward in the direction toward the axis of rotation 106 when the exciting primary current is positive. The magnetic flux of these exciter windings is symbolised in this drawing by solid arrows. According to the invention, the exciter windings are therefore arranged not on poles which are directly adjacent to one another, but only on every other pole.

Furthermore, the arrangement is point-symmetrical to the axis of rotation 106, so that in each case the same winding is present at mutually opposing poles. The receiver windings, i.e. the secondary windings, in which the induced magnetic flux which is influenced by the position of the rotor occurs, are attached to the odd-numbered poles. In this case, the dash arrows 114 denote the magnetic flux of the sine windings and the dot-dash arrows 116 denote the magnetic flux through the cosine windings. The output voltage to be measured is induced in the windings at these poles.

Although in the embodiment shown the primary windings are arranged in such a way that the magnetic flux for the positive primary current is directed in the direction toward the axis of rotation 106 of the resolver 100, the inverse direction of flux may also be provided and in some cases provision may also be made for individual coils to be wound in such a way that they stimulate an inverse flux in order to compensate for asymmetrical magnetic fluxes.

According to the invention, the expression $$\frac{4 \cdot n \cdot p}{t}$$

is an odd number. In this case, n denotes the number of phases, which for conventional resolvers with a sine and cosine signal is equal to 2, p is the number of lobes on the rotor and t denotes the number of teeth on the stator. In the arrangement shown in FIG. 2, the following is therefore obtained:

$$\frac{4 \cdot 2 \cdot 6}{16} = 3.$$

Figure 3:
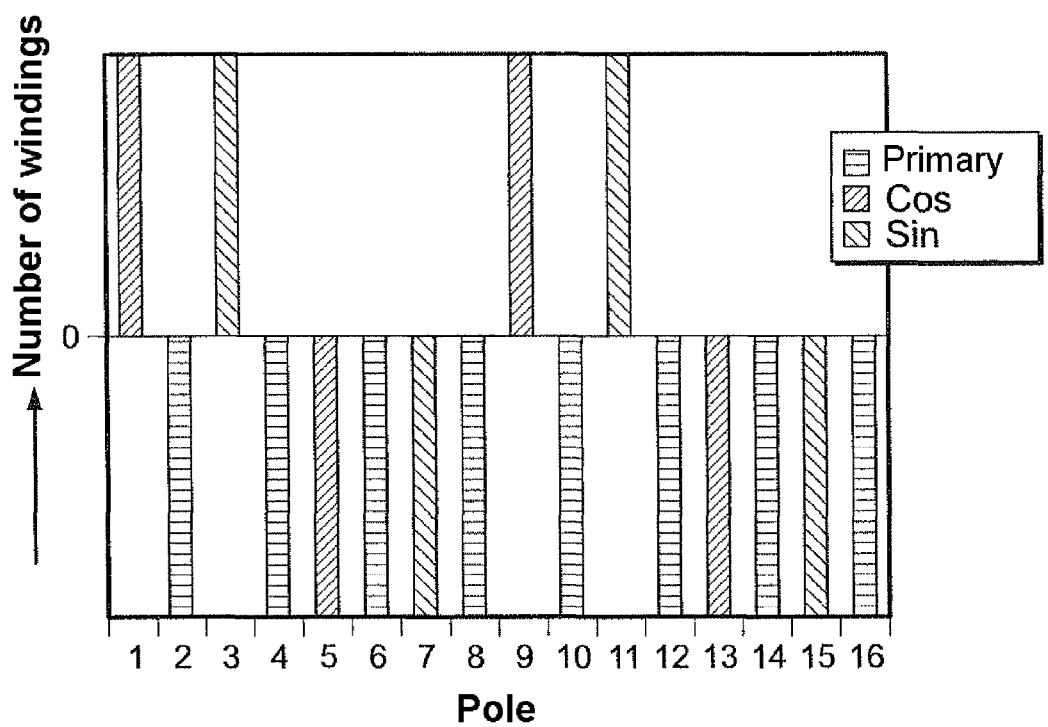
FIG. 3 is a winding diagram for the resolver of FIG. 2.

FIG. 3 is an overview of the winding diagram of the arrangement from FIG. 2. In this case, the number of windings is plotted upward or downward above the respective poles of the stator. The positive or negative sign denotes the winding direction. It will be clear from this that, in accordance with the invention, the primary windings on the one hand are attached only to the even-numbered teeth and on the other hand are all wound in the same direction. The sine secondary windings and the cosine secondary windings are each connected to one another in series in alternating winding directions. Alternatively, the polarities can also be exchanged via the external connections and in all cases the same winding direction can be used for the sine secondary windings and the cosine secondary windings.

Figure 4:
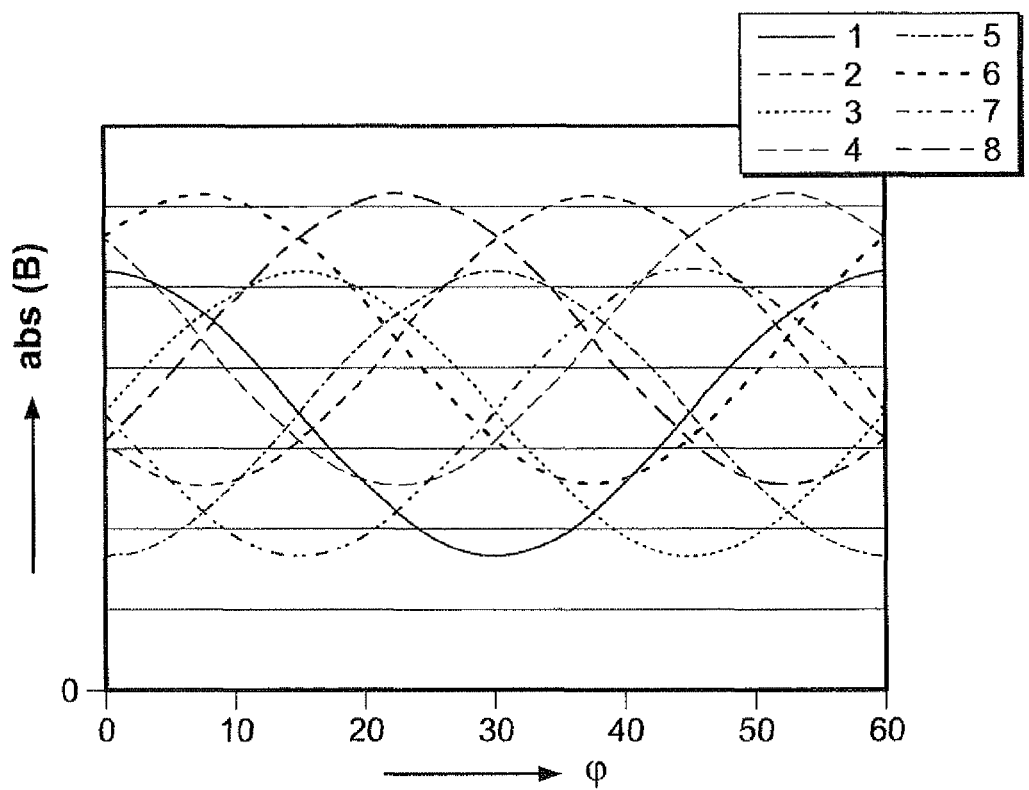
FIG. 4 shows the course of the magnetic field on the individual teeth of the stator from FIG. 2.

FIG. 4 plots the course of the magnetic field for each individual pole of the poles 1 to 8 of the six-speed resolver of FIG. 2 as a function of the mechanical angle φ. As, in a six-speed resolver, the signals are repeated six times during the complete 360° revolution of the rotor, only the range φ=0° to φ=60° is shown both in this figure and in the following figures. In principle, all the signals (current, magnetic flux, B-field, output voltage, etc.) are alternating signals, for example having a frequency of from 2 kHz to 20 kHz. However, for the sake of simplicity, only the respective amplitudes are plotted in the figures. A negative amplitude means in this case that the values are low when the input values are high.

Figure 5:
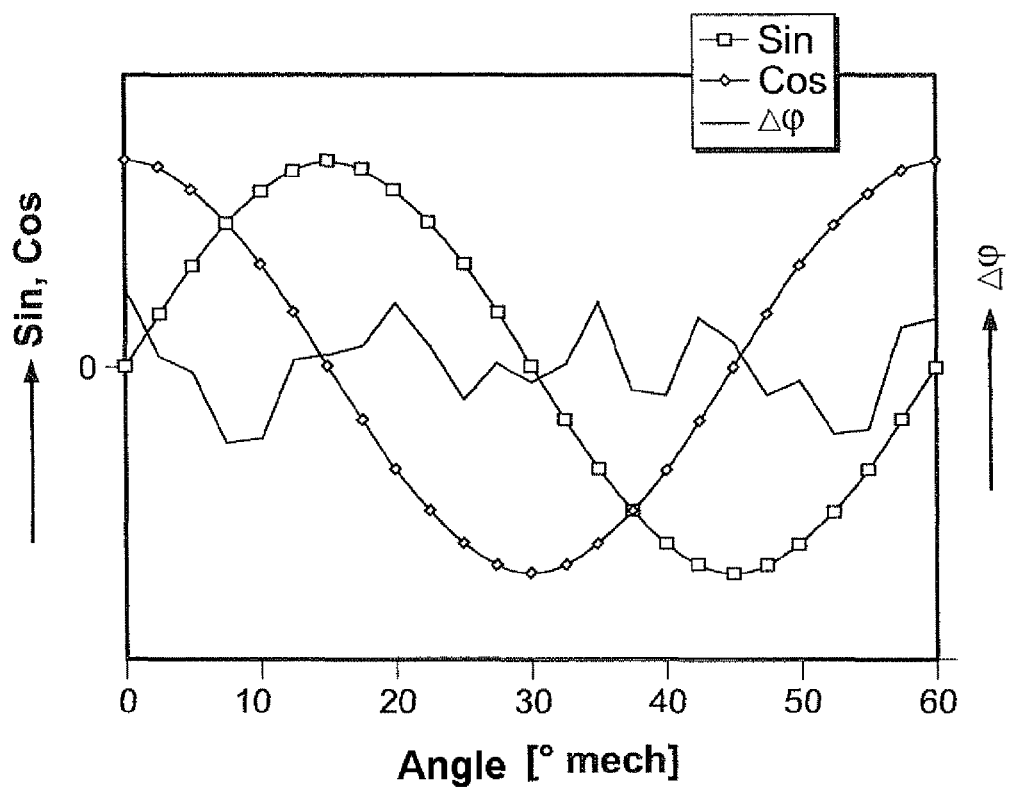
FIG. 5 shows simulated signal courses on the six-speed resolver according to FIG. 2 for the ideal case in which there is no offset between the rotor and stator.

Adding up the cosine voltages or sine voltages connected in series produces the simulated conditions illustrated in FIG. 5. This figure plots on the one hand the sine signal and the cosine signal and on the other hand a deviation Δφ obtained from the calculated value according to φ=arc tan(sin/cos) and the actual angle value. FIG. 5 shows the mechanical error of measurement Δφ for ideal conditions, i.e. for an exact central position of the rotor within the stator.

Figure 6:
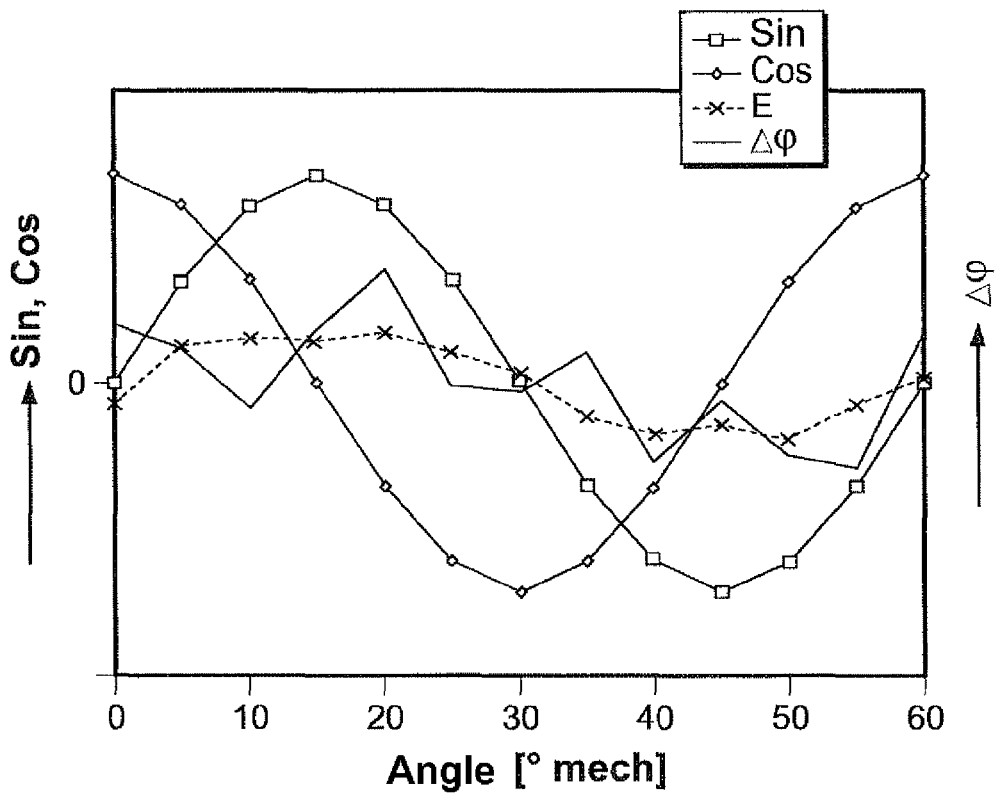
FIG. 6 shows simulated signal courses on the six-speed resolver according to FIG. 2 for the case in which an eccentricity between the rotor and stator and also manufacturing tolerances of the rotor are present.

FIG. 6, conversely, shows the conditions when an eccentricity occurs between the rotor and the stator. For comparison with the results in the ideal case (as illustrated in FIG. 5), the curve Δφ has an additional error component E.

Figure 7:
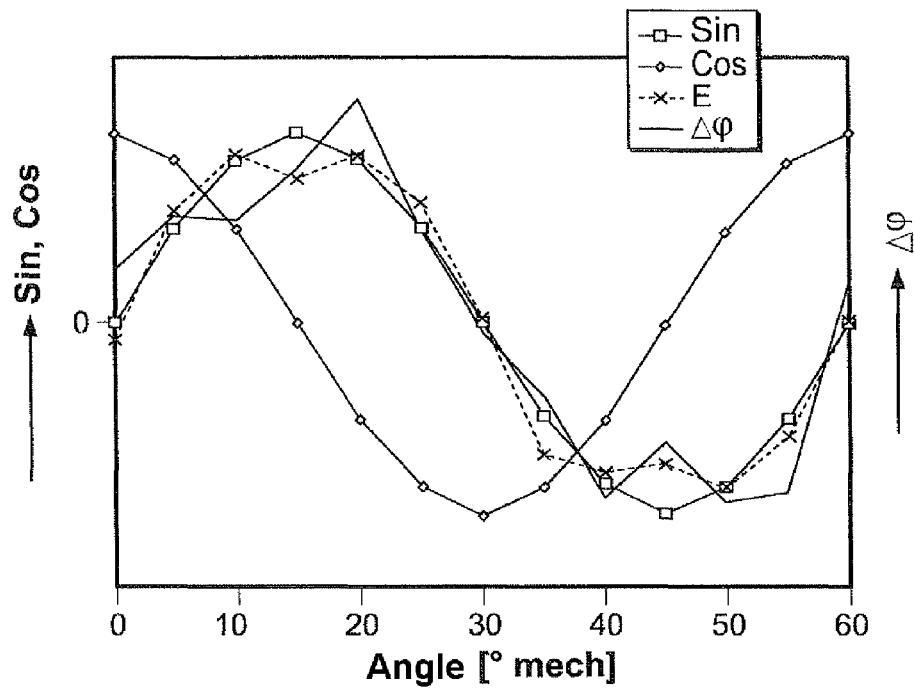
FIG. 7 shows simulated signal courses on the six-speed resolver according to FIG. 2 for the case in which the eccentricity is twice that of FIG. 6.

As also shown in FIG. 7, a much higher additional error component E occurs when the eccentricity of the rotor is doubled, as the error of measurement is not linearly dependent on the eccentricity of the rotor.

Figure 8:
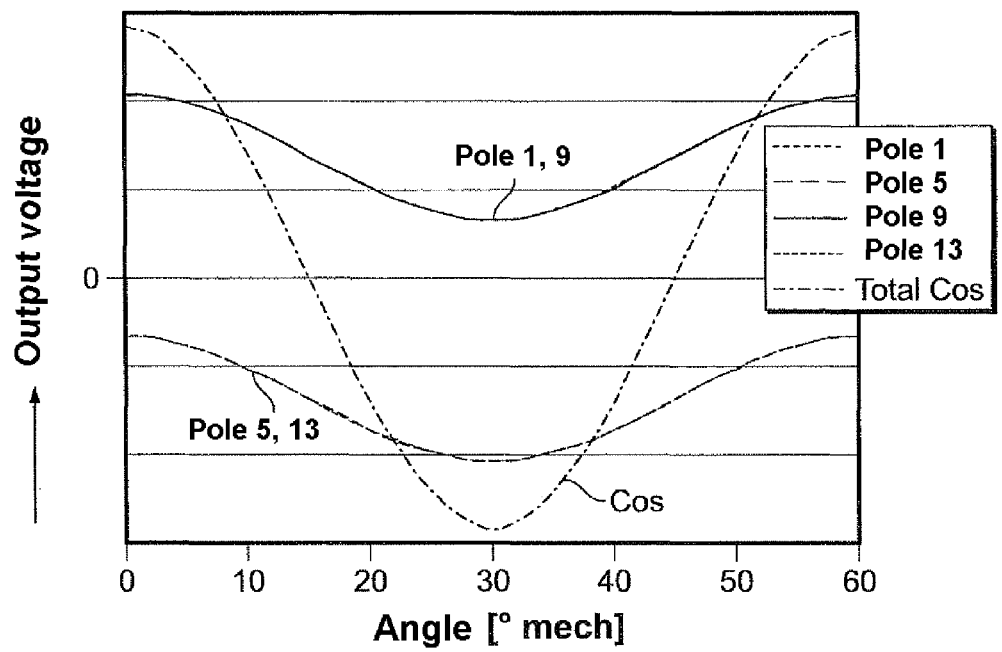
FIG. 8 is an illustration of the output voltages as a function of the mechanical angle for the arrangement of FIG. 2 in the ideal case.
Figure 9:
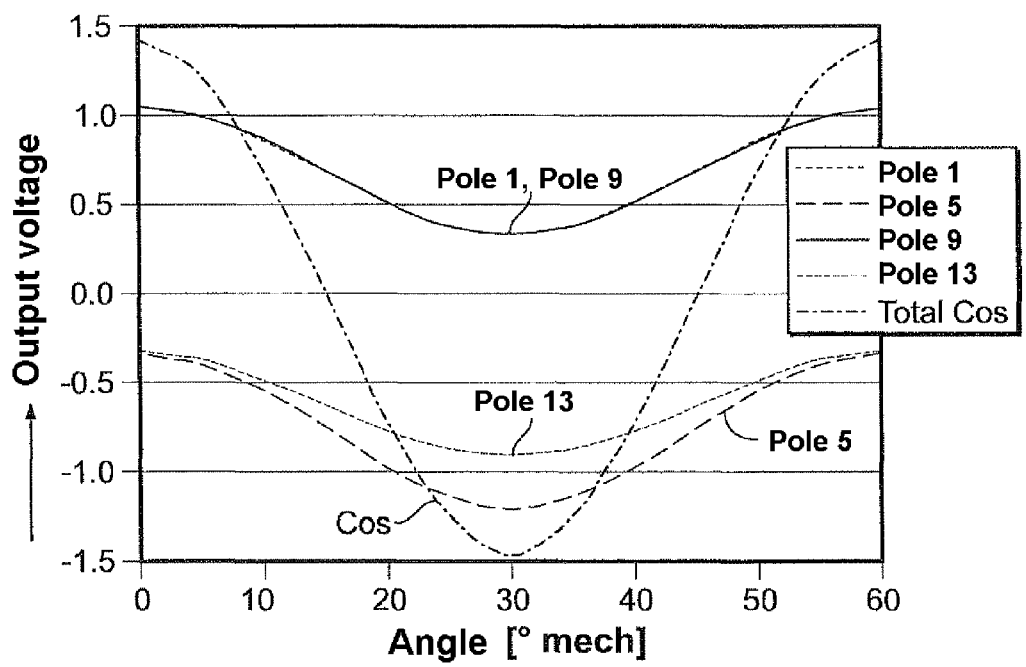
FIG. 9 shows the output voltages as a function of the mechanical angle for the arrangement of FIG. 2 in the case of an eccentric position of the rotor.
Figure 10:
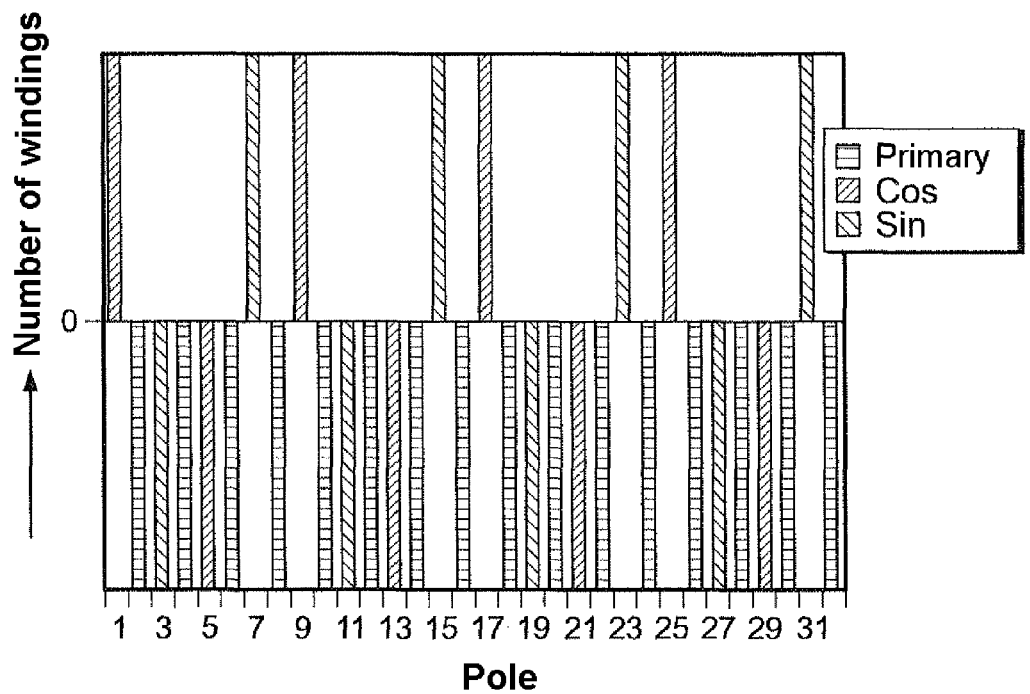
FIG. 10 is a winding diagram for a four-speed resolver similar to the embodiment of FIG. 2.

It may be demonstrated that the ideal case of an eccentric rotor is in reality unachievable and that, as will be described in detail with reference to the second embodiment of FIG. 13, alternative winding diagrams can offer advantages. Nevertheless, the symmetry according to the invention of the rotor and stator in the embodiment described hereinbefore itself offers a marked improvement in accuracy as a result of partial compensation for the error effects:

FIGS. 8 and 9 are overviews of the output voltages for the ideal case compared to an eccentric rotor position (FIG. 10). As is clear from this figure, the output signals for pole 5 and pole 13 are no longer congruent. In this way, the eccentricity can be partially compensated for.

In FIG. 8 the induced voltage in the pole 9 corresponds to that of pole 1 and the voltage in pole 13 corresponds to that in pole 5. The complete cosine output signal is formed from the sum of the voltages at the following poles: pole 1+pole 9+pole 5+pole 13.

If the number of windings on the sides opposing each other in each case by 180° is the same, this offers the advantage that the signals react less sensitively to an eccentricity of the rotor with regard to the stator. If, for example, a horizontal displacement by z mm is assumed, then the size of the air gap between the rotor and stator at pole 5 is reduced by exactly z mm, but the size of the air gap at pole 13 will be greater by z mm. If the magnetic flux and, therefrom, the induced voltage are then calculated, the induced voltages at the poles 5 and 13 will compensate for each other, as may be seen from FIG. 9.

According to the invention, the reluctance resolver has a characteristic number which is calculated in accordance with the formula $$\frac{4 \cdot n \cdot p}{t}.$$

A conventional resolver with a two-phase output signal (sine and cosine) requires at least 4 poles with sine, −sine, cosine and −cosine. In a rotor with p lobes, the lobes are each arranged at 360°/p. The windings on the stator are then arranged at the locations designated in the following Table 1, wherein X is a natural number:

TABLE 1

| cos | X*(360/p) + 0 |
| −sin | X*(360/p) + 1/2*(360/n*p) |
| −cos | X*(360/p) + 1* (360/n*p) |
| sin | X*(360/p) + 3/2*(360/n*p) |

The poles of a resolver with t teeth are located at the locations Y·360°/t, wherein Y assumes values of from 0 to t−1. According to this approach, a cosine winding and subsequently a primary winding are arranged on the first tooth, and a sine or −sine winding are arranged on the third tooth. 2·360°/t should then be located accordingly at the rotor position for sine or −sine.

As shown in the following Table 2, sine and −sine secondary windings are located at the positions x/2·360°/n·p, wherein x is an odd number. In the arrangement shown in Table 2, the following applies: 4·n·p/t=3 (n=2, p=6, t=16).

TABLE 2

| Position on the rotor | | Tooth on the stator | | |
| --- | --- | --- | --- | --- |
| 0 | cos | 0 | cos | |
| 15 | −sin | 22.5 | | primary |
| 30 | −cos | 45 | sin | |
| 45 | sin | 67.5 | | primary |
| 60 | cos | 90 | −cos | |
| 75 | −sin | 112.5 | | primary |
| 90 | −cos | 135 | −sin | |
| 105 | sin | 157.5 | | primary |

TABLE 2-continued

| Position on the rotor | | Tooth on the stator | | |
|---|---|---|---|---|
| 120 | cos | 180 | cos | |
| 135 | −sin | 202.5 | | primary |
| 150 | −cos | 225 | sin | |
| 165 | sin | 247.5 | | primary |
| 180 | cos | 270 | −cos | |
| 195 | −sin | 292.5 | | primary |
| 210 | −cos | 315 | −sin | |
| 225 | sin | 337.5 | | primary |
| 240 | cos | | | |
| 255 | −sin | | | |
| 270 | −cos | | | |
| 285 | sin | | | |
| 300 | cos | | | |
| 315 | −sin | | | |
| 330 | −cos | | | |
| 345 | sin | | | |

A six-speed resolver with 48 teeth would of course also work (4·n·p/t=1), but would be much more expensive and complex to manufacture.

A further example of the resolver according to the invention of the first embodiment will be described hereinafter with reference to FIG. 10. As may be seen from the following Table 3, 32 poles are required in order to develop a four-speed resolver having a symmetrical construction. A 16-pole stator does not offer sufficient space here for the primary windings.

TABLE 3

| Position on the rotor | | Tooth on the stator 32 poles | | Tooth on the stator 16 poles | |
|---|---|---|---|---|---|
| 0 | cos | 0 | cos | 0 | cos |
| 22.5 | −sin | 11.25 | primary | 22.5 | −sin |
| 45 | −cos | 22.5 | −sin | 45 | −cos |
| 67.5 | sin | 33.75 | primary | 67.5 | sin |
| 90 | cos | 45 | −cos | 90 | cos |
| 112.5 | −sin | 56.25 | primary | 112.5 | −sin |
| 135 | −cos | 67.5 | sin | 135 | −cos |
| 157.5 | sin | 78.75 | primary | 157.5 | sin |
| 180 | cos | 90 | cos | 180 | cos |
| 202.5 | −sin | 101.25 | primary | 202.5 | −sin |
| 225 | −cos | 112.5 | −sin | 225 | −cos |
| 247.5 | sin | 123.75 | primary | 247.5 | sin |
| 270 | cos | 135 | −cos | 270 | cos |
| 292.5 | −sin | 146.25 | primary | 292.5 | −sin |
| 315 | −cos | 157.5 | sin | 315 | −cos |
| 337.5 | sin | 168.75 | primary | 337.5 | sin |
| | | 180 | cos | | |
| | | 191.25 | primary | | |
| | | 202.5 | −sin | | |
| | | 213.75 | primary | | |
| | | 225 | −cos | | |
| | | 236.25 | primary | | |
| | | 247.5 | sin | | |
| | | 258.75 | primary | | |
| | | 270 | cos | | |
| | | 281.25 | primary | | |
| | | 292.5 | −sin | | |
| | | 303.75 | primary | | |
| | | 315 | −cos | | |
| | | 326.25 | primary | | |
| | | 337.5 | sin | | |
| | | 348.75 | primary | | |

Again, all the partial windings of the primary winding are wound in one direction and are not located on teeth of the stator that are positioned next to one another.

Figure 11:
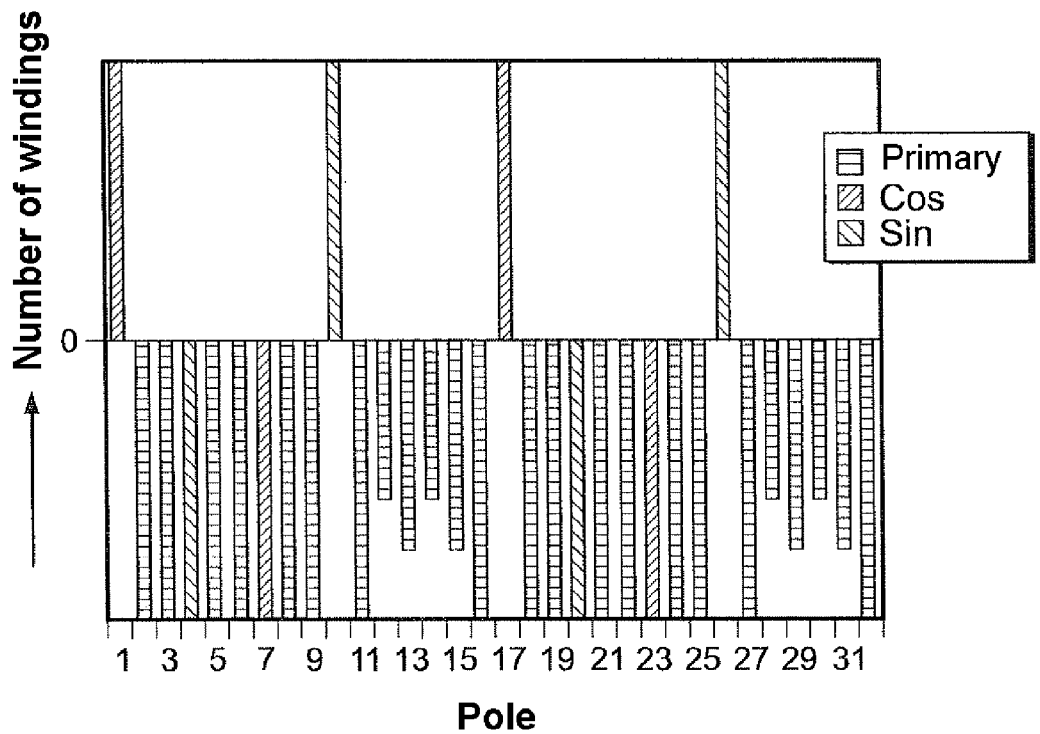
FIG. 11 is an alternative winding diagram for an eight-speed resolver.

FIG. 11 is a winding diagram for an eight-speed resolver with a stator having 32 poles. As listed in the following Table 4, in each case at least two primary windings are arranged between the secondary windings in this embodiment.

If the following is calculated for this case:

$$\frac{4 \cdot n \cdot p}{t},$$

then 2, i.e. an even number, is obtained.

The regular pattern of two primary windings and one secondary winding therefore cannot be maintained at the poles 11 to 16 and 27 to 32. In these poles, the number of windings is altered in order to achieve a similar magnetic field in the poles next to these regions as everywhere else. All the partial windings of the primary winding are wound in the same direction, so that the transmitted magnetic flux points everywhere along the circumference of the stator in the direction toward the rotor.

TABLE 4

| Position on the rotor | | Pole | Tooth on the stator 32 poles | | |
|---|---|---|---|---|---|
| 0 | cos | 1 | 0 | cos | |
| 11.25 | −sin | 2 | 11.25 | −sin | => primary |
| 22.5 | −cos | 3 | 22.5 | −cos | => primary |
| 33.75 | sin | 4 | 33.75 | sin | |
| 45 | cos | 5 | 45 | cos | => primary |
| 56.25 | −sin | 6 | 56.25 | −sin | => primary |
| 67.5 | −cos | 7 | 67.5 | −cos | |
| 78.75 | sin | 8 | 78.75 | sin | => primary |
| 90 | cos | 9 | 90 | cos | => primary |
| 101.25 | −sin | 10 | 101.25 | −sin | |
| 112.5 | −cos | 11 | 112.5 | −cos | => primary |
| 123.75 | sin | 12 | 123.75 | sin | => primary |
| 135 | cos | 13 | 135 | cos | => primary |
| 146.25 | −sin | 14 | 146.25 | −sin | => primary |
| 157.5 | −cos | 15 | 157.5 | −cos | => primary |
| 168.75 | sin | 16 | 168.75 | sin | => primary |
| 180 | cos | 17 | 180 | cos | |
| 191.25 | −sin | 18 | 191.25 | −sin | => primary |
| 202.5 | −cos | 19 | 202.5 | −cos | => primary |
| 213.75 | sin | 20 | 213.75 | sin | |
| 225 | cos | 21 | 225 | cos | => primary |
| 236.25 | −sin | 22 | 236.25 | −sin | => primary |
| 247.5 | −cos | 23 | 247.5 | −cos | |
| 258.75 | sin | 24 | 258.75 | sin | => primary |
| 270 | cos | 25 | 270 | cos | => primary |
| 281.25 | −sin | 26 | 281.25 | −sin | |
| 292.5 | −cos | 27 | 292.5 | −cos | => primary |
| 303.75 | sin | 28 | 303.75 | sin | => primary |
| 315 | cos | 29 | 315 | cos | => primary |
| 326.25 | −sin | 30 | 326.25 | −sin | => primary |
| 337.5 | −cos | 31 | 337.5 | −cos | => primary |
| 348.75 | sin | 32 | 348.75 | sin | => primary |

Figure 12:
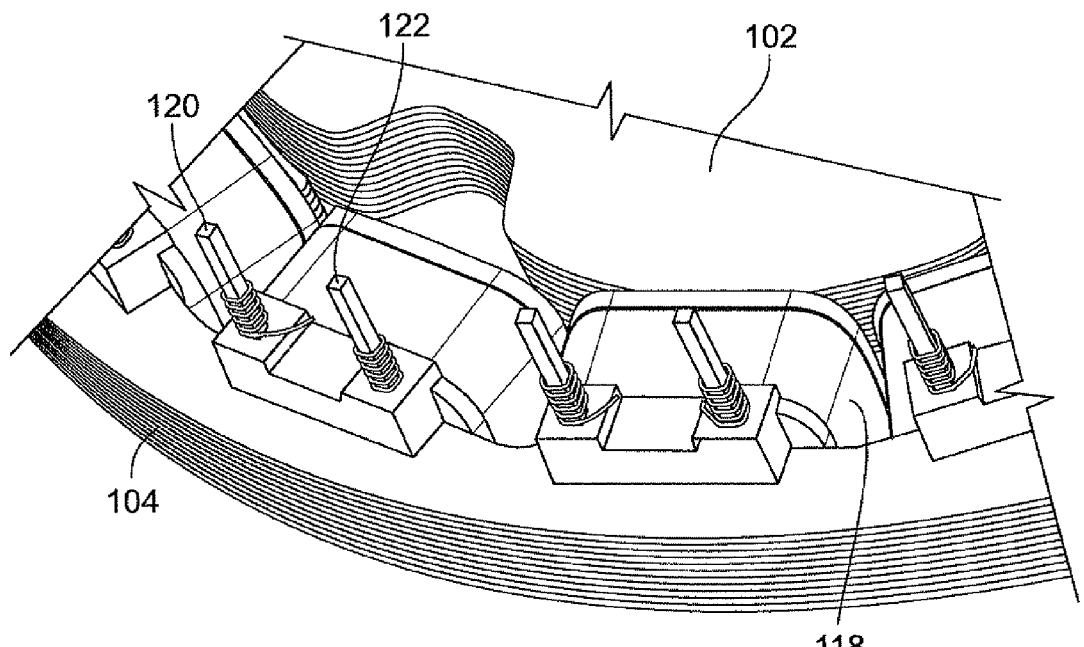
FIG. 12 is a perspective partial view of the stator of FIG. 2 with attached coil bodies of an alternative embodiment.

According to an advantageous embodiment of the present invention, such as is shown in FIG. 12, the individual windings are wound onto loose coil bodies 118 and these coil bodies, which have electrical connections 120, 122, are slid onto the teeth 110 of the stator 104.

Figure 18:
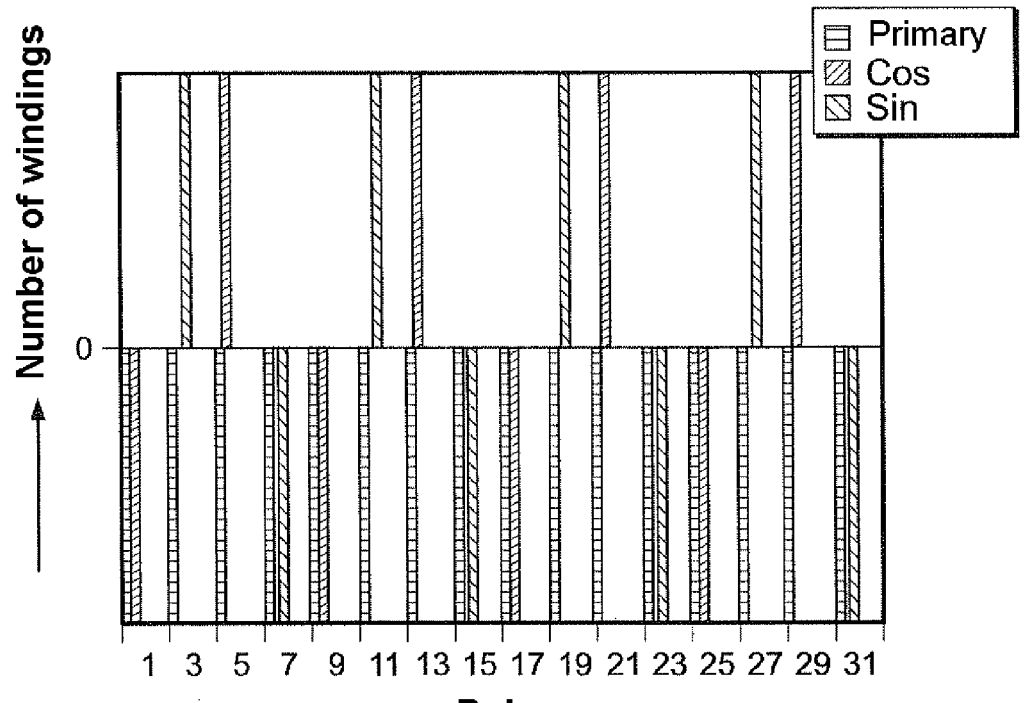
FIG. 18 is a winding diagram for a four-speed resolver similar to the embodiment of FIG. 13.

In order to connect the individual coil connections 120, 122 to one another, a wiring board 124 is installed in a next operation, such as is shown in FIG. 18. The wiring board 124 carries conductor tracks 126 which connect the desired connections to one another. In this case, the wiring board 124 may be formed in a known manner by a printed circuit board, a flexible circuit board or a lead frame. The contacting between the connections 120, 122 of the coil bodies 118 and the conductor tracks 126 is carried out in a known manner via soldering, adhesive bonding, pressing-in or other known electrical contacting means.

As mentioned hereinbefore, an eccentricity between the rotor and the stator can lead in the previously discussed first embodiment to considerable inaccuracies. A second embodiment therefore proposes an arrangement in which two respective windings are arranged on each stator pole. FIG. 13 is a schematic cross section through an alternative six-speed resolver of this type.

Again, only the even-numbered poles carry primary windings and all the primary windings are wound in such a way that the direction of the magnetic flux points toward the axis of rotation 106 of the rotor. The magnetic flux returns through the odd-numbered poles. However, in contrast to the foregoing embodiment, according to the embodiment shown in FIG. 13, each stator pole also carries a second winding, so that either a primary winding with a secondary winding or two different secondary windings together are arranged on one and the same stator pole.

Figure 13:
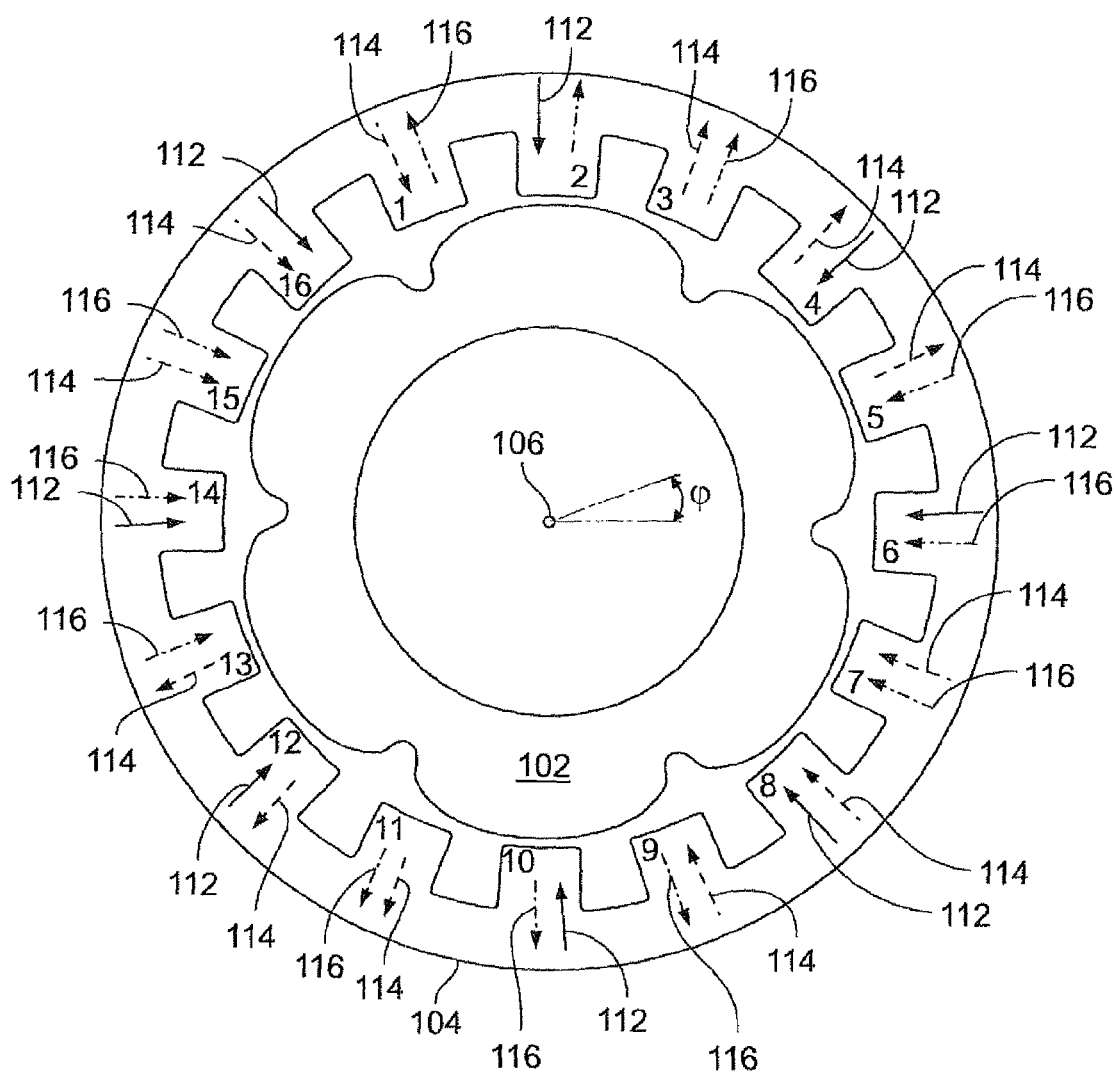
FIG. 13 shows a second advantageous embodiment of a six-speed resolver according to the present invention.
Figure 14:
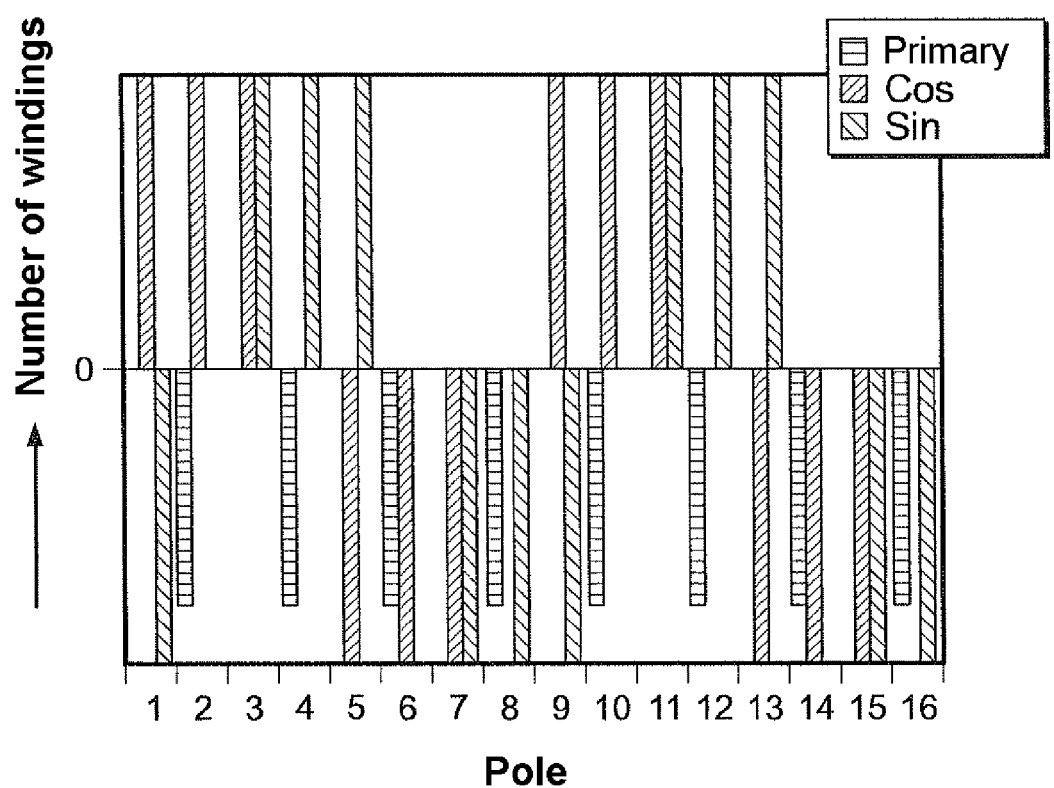
FIG. 14 is a winding diagram for the resolver of FIG. 13.

FIG. 14 is the winding diagram for the six-speed resolver from FIG. 13. It may be seen from this that, according to this embodiment, the primary windings all have the same number of windings, but fewer windings than the sine secondary windings and the cosine secondary windings. However, alternatively, it is also possible for the same number of windings to be used everywhere, thus simplifying manufacture.

Figure 15:
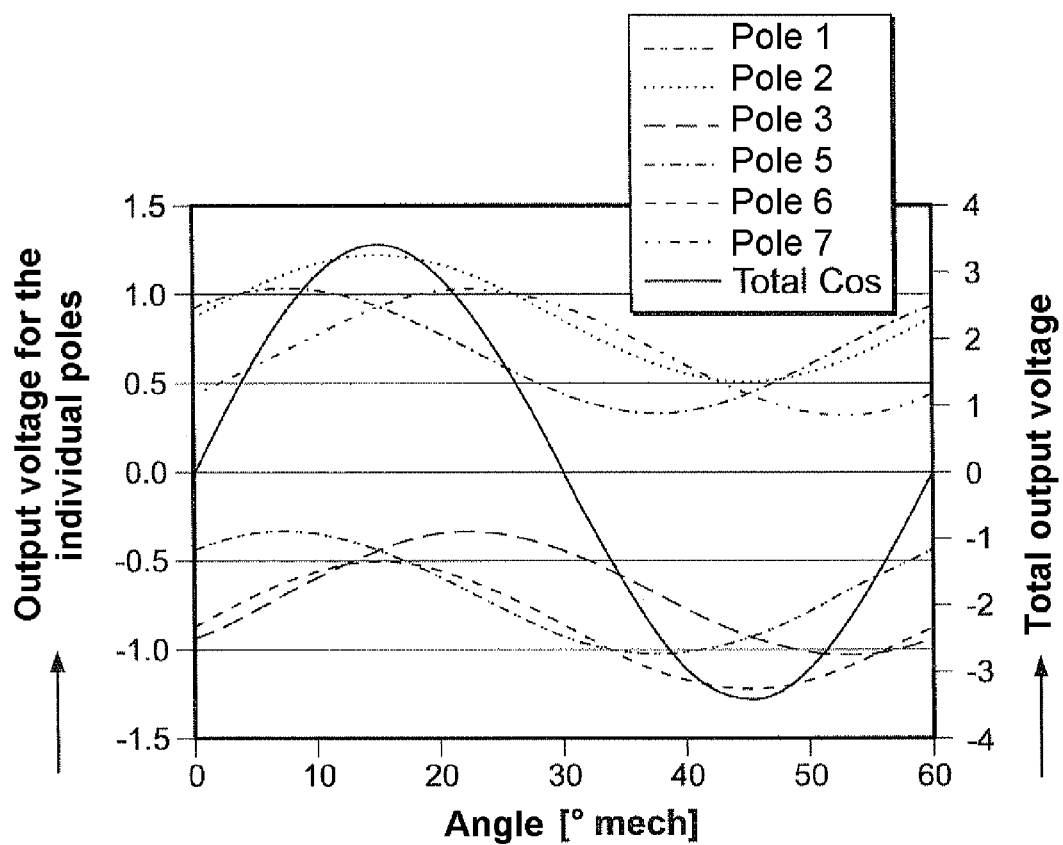
FIG. 15 is an illustration of the output voltages of the arrangement of FIG. 13.

FIG. 15 shows an example of the output voltages at the poles 1, 2, 3, 5, 6 and 7. The voltages induced in the poles 9, 10, 11, 13, 14 and 15 are identical to these. The total cosine signal is calculated from the sum of all the voltages induced in these poles.

Figure 16:
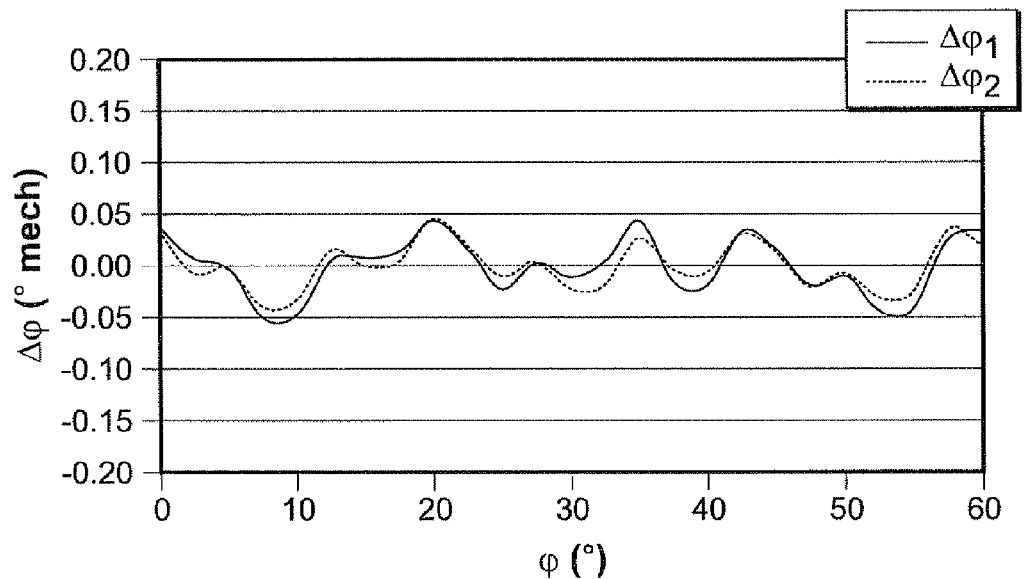
FIG. 16 is an illustration of the angular deviation as a function of the mechanical angle in comparison between the arrangements of FIG. 2 and FIG. 13.
Figure 17:
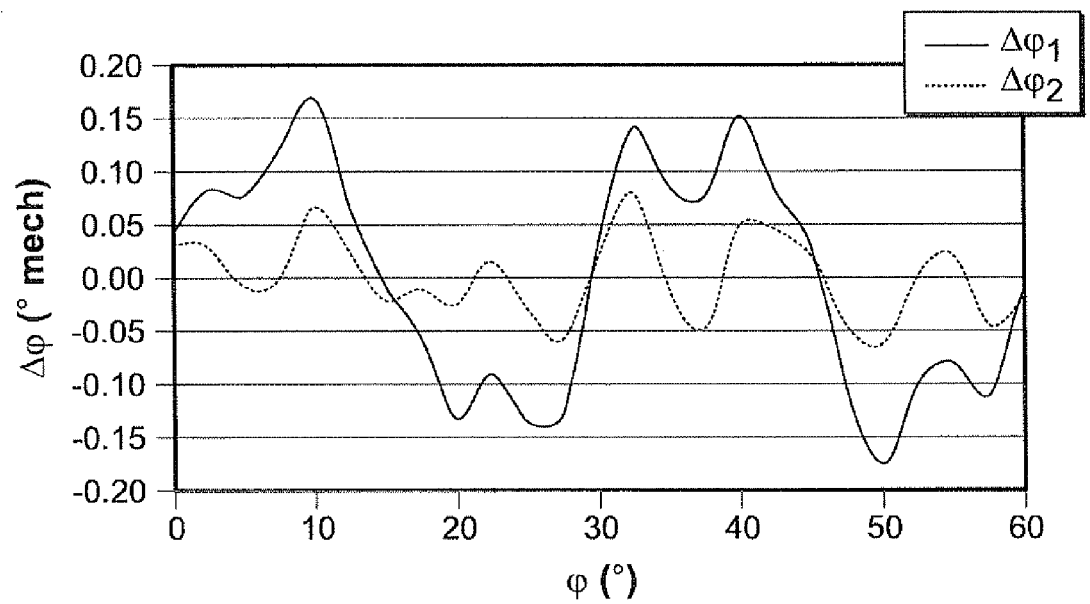
FIG. 17 is an illustration of the angular deviation as a function of the angle in an eccentric rotor in comparison between the arrangements of FIG. 2 and FIG. 13.

The advantage of this second embodiment may be seen on examination of FIGS. 16 and 17. FIG. 16 plots the angular deviation $\Delta\phi_1$ of the embodiment from FIG. 2 compared to the angular deviation $\Delta\phi_2$ in the embodiment from FIG. 13 for an exactly centric rotor. The two curves have a very similar course, so that there is no difference for this case.

However, as is clear from FIG. 17, for the case in which the rotor is arranged outside the centre, the error $\Delta\phi_2$ for the arrangement from FIG. 13 is now only half the size of the error $\Delta\phi_1$ of the arrangement from FIG. 2. This may be explained by the fact that, on account of the non-central arrangement of the rotor, the induced voltages of the individual poles are unsymmetrical, leading to the deviations in the output signals. The variations in amplitude are caused by a detection of non-uniform magnetic flux of the poles as a consequence of the fluctuation of the air gap. These inaccuracies are detected as higher-order harmonics when they are analysed. In order to prevent these inaccuracies, the alternative winding diagram according to FIG. 13 comprises more windings of the detector circuits. For example, twelve secondary windings are provided instead of the previously shown four secondary windings. Errors as a consequence of a variation of the magnetic flux amplitude in the detector coils are therefore corrected by the respectively adjacent poles.

An alternative winding diagram with in each case two windings on each stator pole for a four-speed resolver is shown in FIG. 18.

Figure 19:
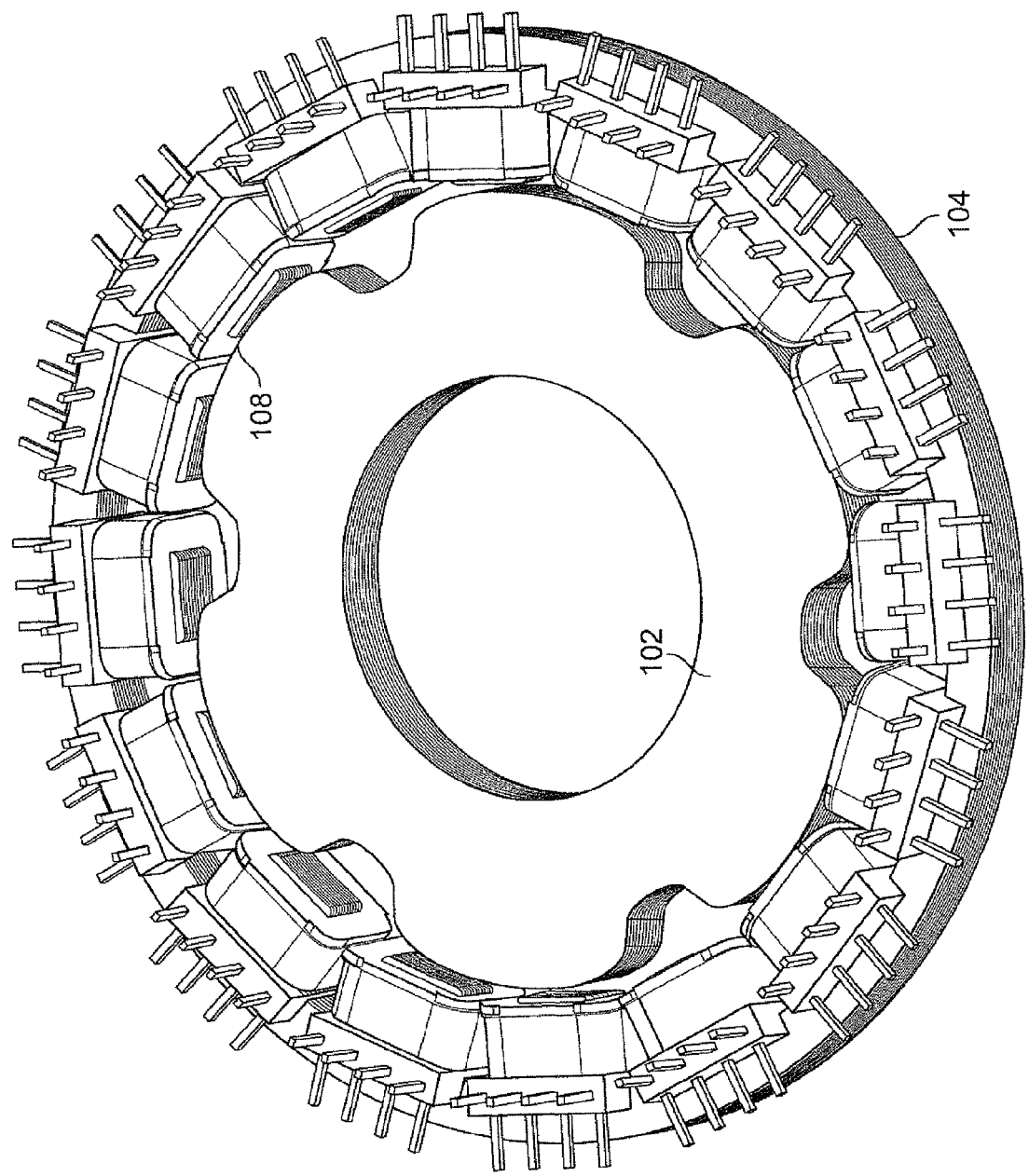
FIG. 19 is a perspective partial view of the arrangement from FIG. 13 after fitting with loose coil bodies.
Figure 20:
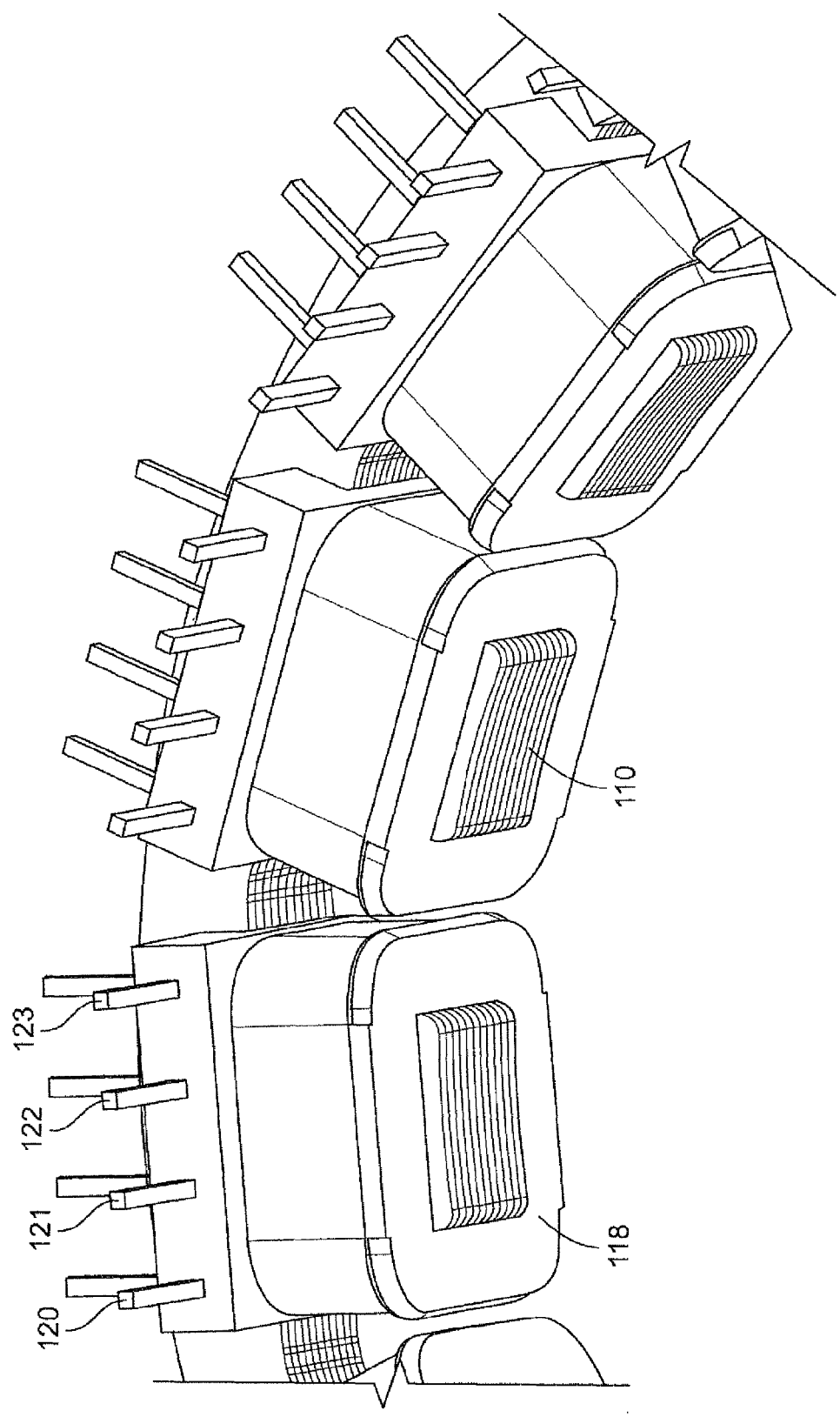
FIG. 20 is a perspective partial view of the fitted stator from FIG. 19.
Figure 21:
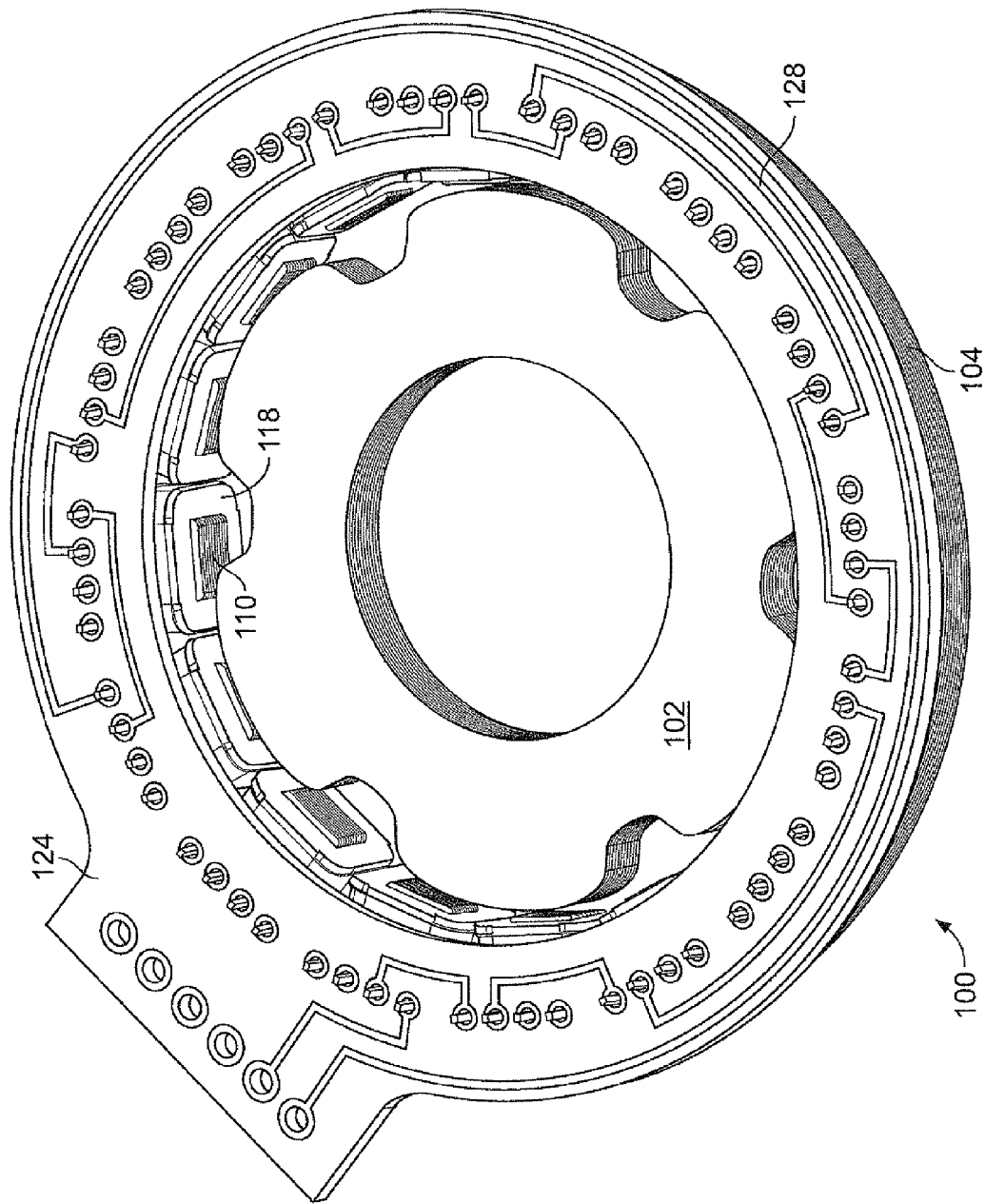
FIG. 21 is a perspective view of the resolver arrangement of FIG. 13 in the fully installed state with the electrical return path in the circuit board.

As may also be seen from FIGS. 19 to 21, it is also possible for two windings to be wound onto a loose coil body 118, wherein now a total of four electrical connections 120, 121, 122, 123 have to be guided outward. Connection with the aid of a lead frame or a printed circuit board 124 is also possible.

FIG. 21 shows an embodiment of the wiring board 124 in which the printed circuit board 124 contains a return path 128 for the electrical signal. This return path 128 can prevent the occurrence in the direction of the axis of rotation of a magnetic flux connection which might influence the output signals in an undesirable manner. The other two circuits have similar return paths on the underside of the circuit board.

Figure 22:
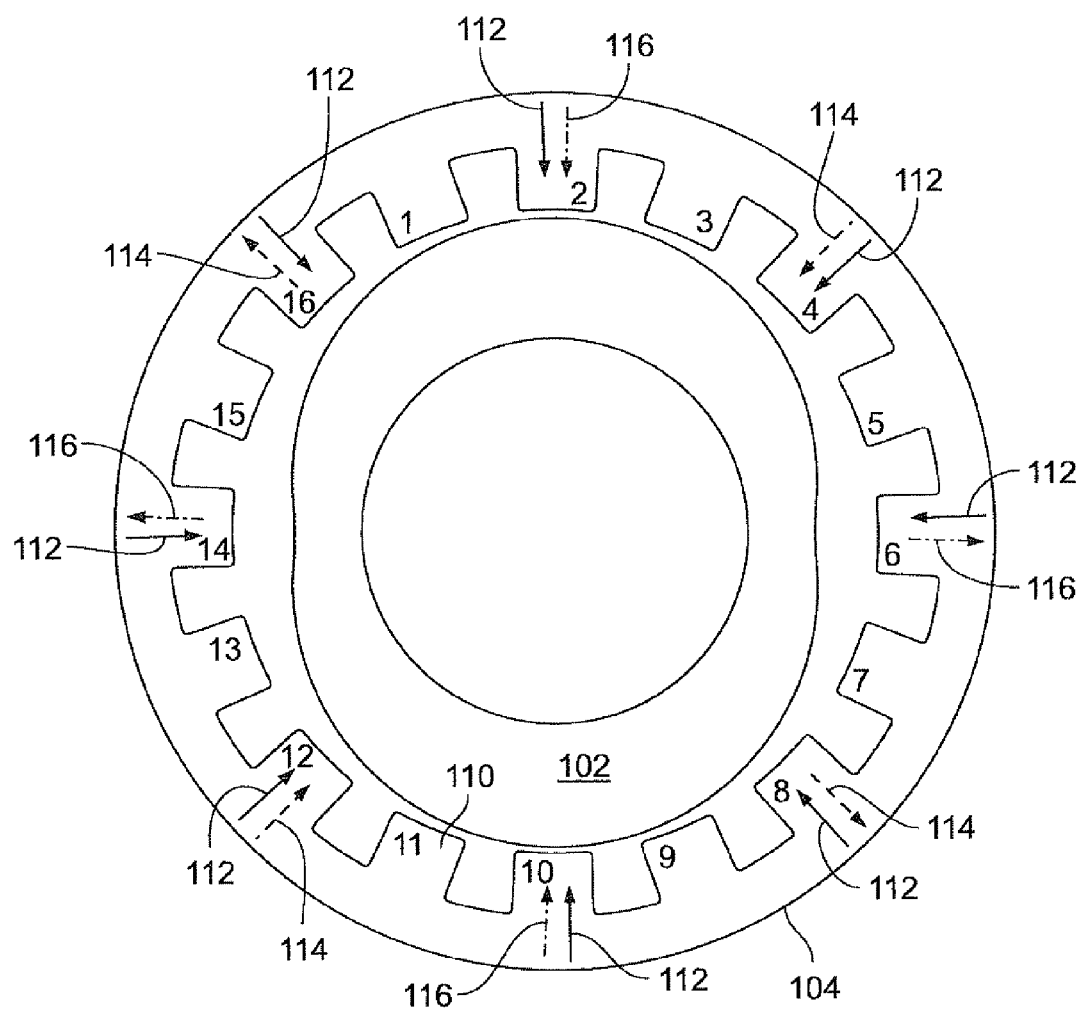
FIG. 22 is a schematic cross section through a resolver arrangement according to a further advantageous embodiment.

Finally, FIG. 22 shows a two-speed resolver 100 in which a rotor 102, which has two lobes, is combined with a 16-pole stator 104. This is similar to the four-speed rotor with a 32-pole stator. In this embodiment, only every other tooth 110 is provided with a primary winding and a secondary winding. Both the principle that all the primary windings are wound in the same direction and the complete symmetry of the rotor and stator are also implemented in this embodiment. This provides, in addition to particularly simple assemblability, also the above-described advantages with respect to accuracy and insensitivity to any assembly and production tolerances.

Although the foregoing discussion has assumed in all cases loose coil bodies, the windings according to the present invention can also be wound directly onto the stator, wherein additional plastics material parts may (but do not necessarily have to) be used. Most connections can then be carried out directly with the aid of the magnetic wire. The return path for the electrical signal is then also implemented with a magnetic wire or cable.

The invention claimed is:

1. Magnetoelectronic angle sensor with an at least partially ferromagnetic stator and an at least partially ferromagnetic rotor which oppose each other by forming an annular air gap, wherein the magnetic resistance in the air gap changes periodically on account of a shaping of the rotor that varies over the circumference when the rotor rotates about an axis of rotation,
   with a magnetic flux transmitter which is arranged on the stator and generates via at least one pair of poles a predefined magnetic flux distribution in the air gap,
   with a magnetic flux receiver which is arranged on the stator and measures the intensity of the magnetic field via at least two pairs of signal poles arranged offset from one another at an angle, wherein an angle value for the position of the rotor in relation to the stator can be derived from the two receiver signals,
   the stator having distributed over the circumference a large number of teeth which are separated from one another by grooves, and the magnetic flux transmitter comprising at least two primary windings which are arranged in such a way that at least one of the teeth carries no primary windings.

2. Angle sensor according to claim 1, wherein the primary windings are arranged in such a way that they generate a radially extending magnetic flux, a direction of the magnetic flux being in each case oriented, in the same manner for all the primary windings, in the direction toward the axis of rotation or leading away from the axis of rotation.

3. Angle sensor according to claim 1, wherein a primary winding and a secondary winding of the magnetic flux receiver are arranged on the teeth of the stator distributed over the circumference in each case in alternation.

4. Angle sensor according to claim 1, wherein a characteristic variable $$\frac{4 \cdot n \cdot p}{t}$$

is an odd number, wherein n is equal to a number of phases of the angle sensor, p is equal to a number of cams forming the shaping on the rotor, t is equal to a number of teeth on the stator.

5. Angle sensor according to claim 1, wherein the magnetic flux receiver has at least two sine secondary windings and at least two cosine secondary windings which are offset from the sine secondary windings by 90 electrical degrees.

6. Angle sensor according to claim 1, wherein the windings are each attached to separate coil bodies.

7. Angle sensor according to claim 6, wherein electrical connections between windings are produced via a printed circuit board, a flexible circuit board or a lead frame.

8. Angle sensor according to claim 7, wherein the electrical connection between connections of the coil bodies and the printed circuit board or the lead frame is produced by soldered connections, welded connections or press-in connections.

9. Angle sensor according to claim 1, wherein two different windings are arranged on each of the teeth of the stator.

10. Angle sensor according to claim 1, further comprising at least one return path for returning an electrical signal.

11. Angle sensor according to claim 10, wherein the at least one return path is formed by a conductor track on a printed circuit board or a wire.

12. Angle sensor according to claim 1, wherein at least all the primary windings have an identical number of windings.

13. Angle sensor according to claim 1, wherein at least one of the primary windings has, for influencing the transmitted magnetic field in a targeted manner, a number of windings differing from the remaining primary windings.

14. Angle sensor according to claim 1, wherein the rotor and the stator are constructed, with the magnetic fluxes occurring thereon, point-symmetrically in their cross section to the axis of rotation.

15. Angle sensor according to claim 1, wherein the magnetic flux receiver has at least two sine secondary windings and at least two cosine secondary windings which are offset from the sine secondary windings by 90 electrical degrees and wherein on every other tooth of the stator a primary winding and a secondary winding are arranged in such a way that sine secondary windings and cosine secondary windings alternate in each case.

* * * * *